UNITED STATES PATENT OFFICE.

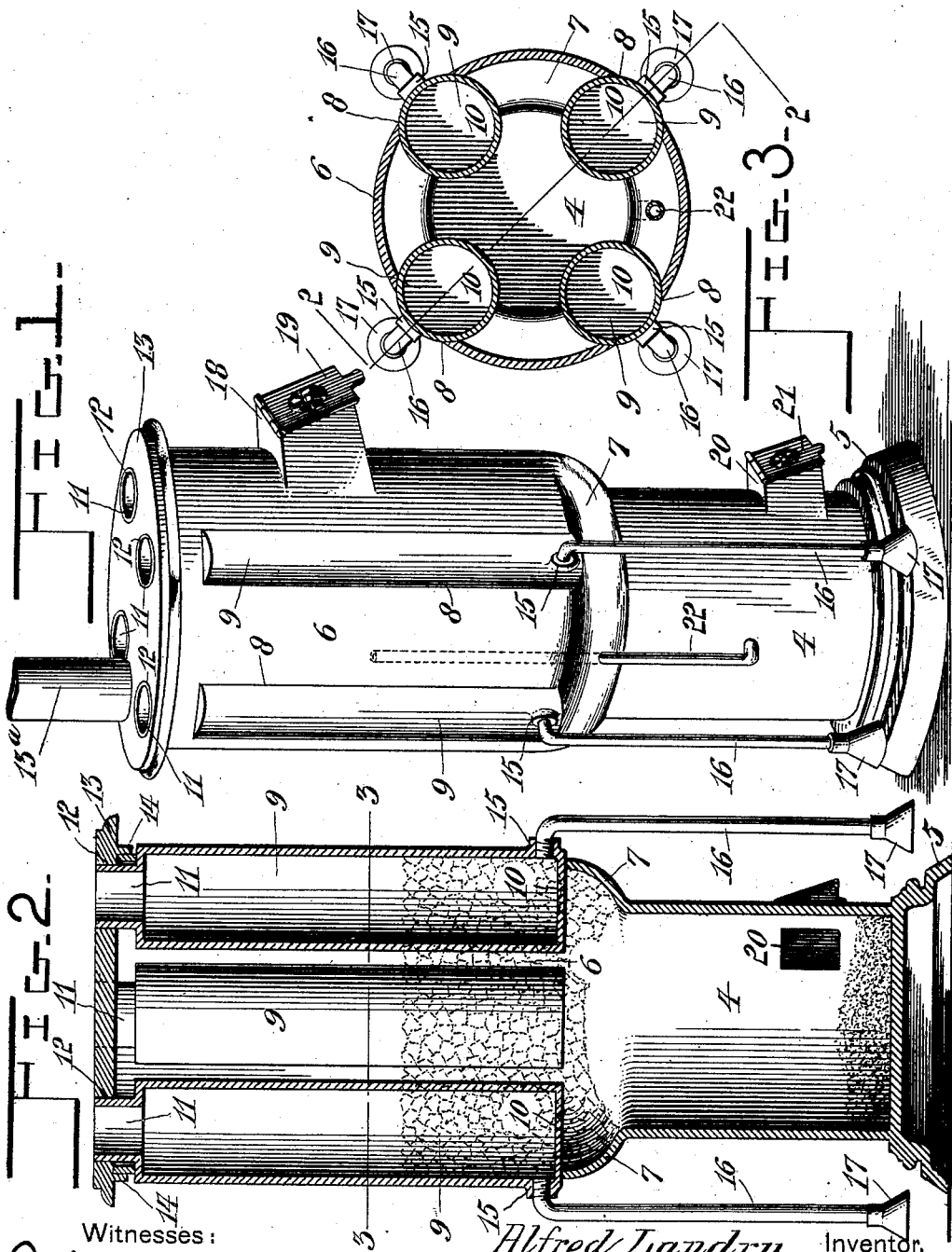

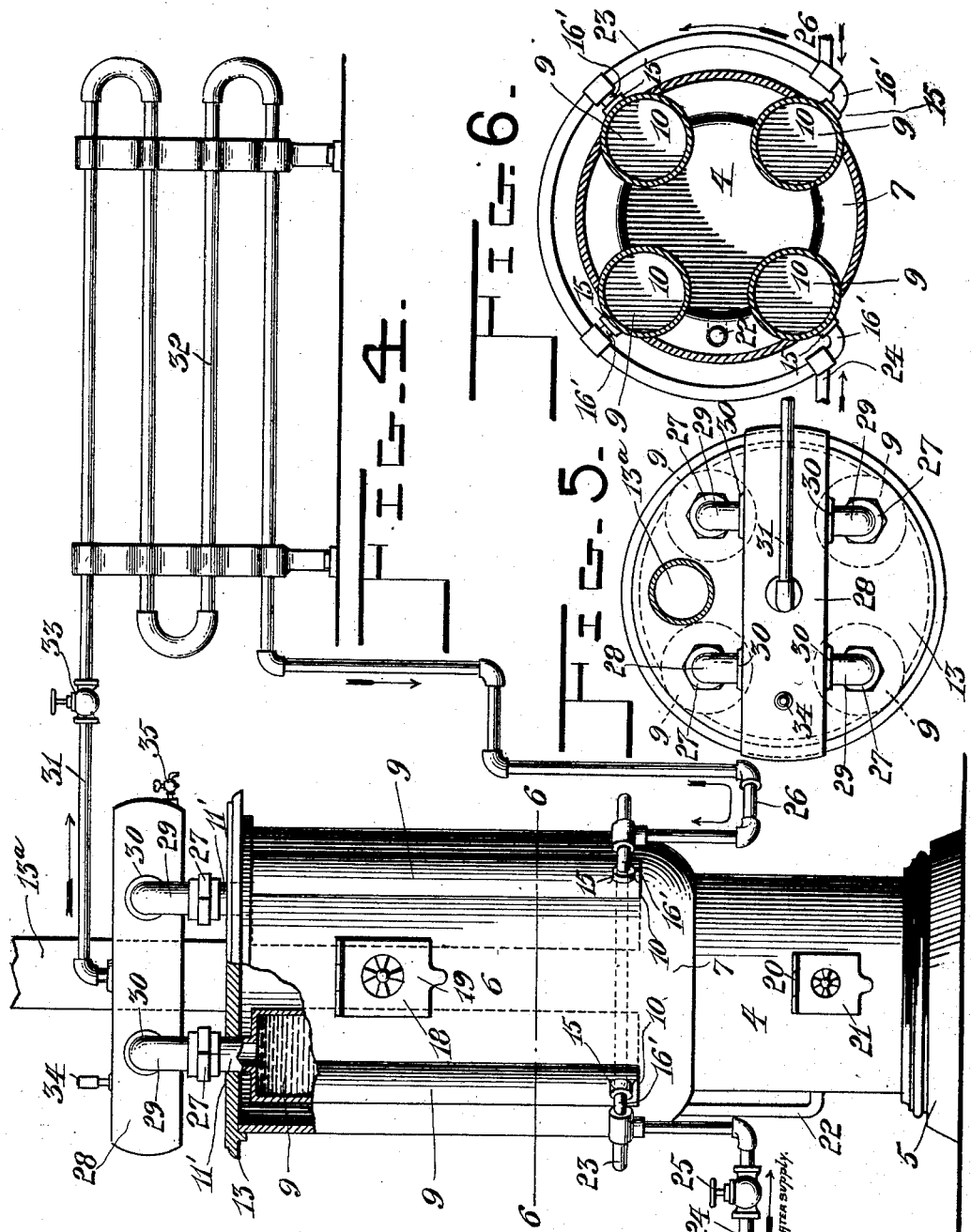

ALFRED LANDRY, OF RICHMOND, CANADA.

STOVE.

SPECIFICATION forming part of Letters Patent No. 716,436, dated December 23, 1902.

Application filed April 21, 1902. Serial No. 103,867. (No model.)

*To all whom it may concern:*

Be it known that I, ALFRED LANDRY, a subject of the King of Great Britain, residing at Richmond, county of Richmond, Province of Quebec, Canada, have invented certain new and useful Improvements in Stoves; and I do hereby declare that the following is a full, clear, and exact description of the invention, such as will enable others skilled in the art to which it appertains to make and use the same.

My invention relates to an improved stove for heating purposes; and its object is to produce a stove which shall combine compactness with large heating-surfaces and capacity, whereby a comparatively small stove may be enabled to heat a large compartment or series of apartments.

The novelty resides in the peculiar construction, arrangement, and combination of parts, all as more fully herein described, shown in the drawings, and then particularly pointed out in the appended claims.

My invention is clearly shown in the accompanying drawings, wherein—

Figure 1 is a perspective view of a stove built according to my invention for air-heating purposes. Fig. 2 is a vertical central section thereof on the line 2 2 of Fig. 3. Fig. 3 is a plan-section on the line 3 3 of Fig. 2. Fig. 4 is a side elevation showing my improvement adapted to a hot-water-circulating system. Fig. 5 is a plan view of the same, and Fig. 6 is a sectional view taken on the line 6 6 of Fig. 5.

The same numerals of reference denote like parts in each of the several figures of the drawings.

The stove shown in Figs. 1, 2, and 3 is formed with a cylindrical lower portion 4, supported on a flanged base 5 and supporting in turn an upper cylindrical portion 6, of larger diameter than the cylindrical portion 4, the two being connected by a cup-shaped annular portion 7. The walls of the upper cylindrical portion 6 are cut away at intervals in its periphery, as shown at 8, for the insertion from the inside of the edges of a series of cylindrical air-heating tubes 9, which project partly through the apertures 8 in the cylinder 6, as shown in Fig. 1, and are firmly secured therein. These edges 9 are closed at their base by flat bottom plates 10, abutting against the cup-shaped annular portion 7 of the stove-body, and their upper ends are reduced to smaller tubes or necks 11, which project upwardly and through suitable apertures 12 in the cover 13 of the stove, which is provided with a downwardly-depending flange 14, retaining it in place, covering the cylinder 6. Through one side of the lid or cover 13 is formed an aperture for the flue-pipe 13ª, which carries off the chimney-gases. Close to the bottom plates 10 in each air-tube 9 there is a side opening formed, as shown, with a boss 15, which is screw-threaded and into which is screwed the end of a depending smaller tube 16, which hangs down outside the cylindrical portion 4 and has a flared mouthpiece 17 near the floor and facing the latter. The upper portion 6 of the body is provided with a charging-opening 18, closed by a door 19, and the lower part 4, which forms the ash-pit, is provided with a discharging-orifice 20, having an ash-door 21. A gas-pipe 22 is let into the side of the cylindrical portion 4 midway thereof and passes upwardly through the cup-shaped annular portion 7, terminating in the upper half of the cylindrical portion 6, this pipe being intended to carry fresh air through the coals to the space above the fire to burn the carbonic oxid and other gases which are formed by the insufficient supply of air passing through the bed of coals.

My improved stove requires no grate in operation, the fire being first kindled from ordinary kindling-wood in the lower part 4 and the coal being charged in through the opening 18 until it reaches the level indicated in Fig. 2, the bed of coals being supported by the cup-shaped portion 7, and thus a grate is dispensed with. The fire proper is contained entirely within the upper portion 6 of the stove, and the tubes 9 will consequently be heated to a high degree, and the air will be drawn in through the flaring mouthpieces 17 in the tubes 16 and pass out through the open ends 11, becoming highly heated on its way through the tubes, this having the further effect of always drawing in cold air, and therefore uniformly maintaining the temperature of the apartment or dwelling.

When my improved stove is to be adapted to a hot-water-circulating system, I provide the ends of the tubes 9 with suitable connections to the outgoing and return pipes of the heating system, and these connections are preferably arranged in the manner shown by the second sheet of my drawings—that is to say, in Figs. 4, 5, and 6, respectively. In this case the stove itself is of exactly the same form and structure as that shown in Figs. 1, 2, and 3, the only difference being in the connections which are attached to the upper and lower ends of the tubes 9, the depending tubes 16 being preferably removed for this purpose and replaced by a ring-main 23, which is connected at one end to the water-supply pipe 24, provided with a valve 25, and at the other end connected to the return-pipe 26 of the heating system, while their branch pipes 16' opposite each of the lower ends 10 of the tubes 9, and which are screwed into the bosses 15 on these tubes, are the same as in the case of the air-inlet pipe 16 in the form shown in Fig. 1. The necks 11' at the upper ends of the tubes 9 are herein shown as slightly smaller in size than the necks 11 in the first form, and they are prolonged above the cover-plate 13 of the stove, so as to form nipples for the attachment of the unions 27, connecting them to the cylindrical heating-drum 28, located immediately over and transversely of the stove by the intermediate elbows 29, which are screwed into suitable bosses 30 in the sides of the drum. From the upper side of the drum proceeds the outgoing pipe 31 of the heating system, herein represented generically by a single radiator 32, although it will be understood, of course, that any number and style of radiators may be connected to the system, and to regulate the flow of water through the system there is provided a valve 33 in the pipe 31. The heating-drum is furthermore provided at its upper side with a safety-valve 34, which may be in the form of a steam-release valve to permit the exit of any steam or vapor formed in the drum of any abnormally high pressure, and to release or draw the water from the drum when necessary I provide a petcock or bib 35.

My improvement has the advantage of combining simplicity with a maximum of efficiency in operation, thus producing a stove which provides means for circulating currents of air or water through it at a cost scarcely greater than that of the ordinary stove in common use, and the application of this form of stove to hot-water heating systems is also a very advantageous feature, avoiding the necessity of installing a separate plant and likewise more fully and completely utilizing the heat generated by the fuel.

Having thus described my invention, what I claim, and desire to secure by Letters Patent, is—

1. A heating-stove comprising a cylindrical body, the walls of which are cut away at intervals at its periphery, vertical circulating-tubes, the peripheries of which are projected partly through the apertures in the body portion, said tubes being closed at their lower ends and extended through the combustion-chamber, the pipe connecting the lower portion of said stove with said body portion without the space inclosed by said tubes and a cylindrical lower portion of less diameter than the said cylindrical body and depending tubes communicating with the interior of said circulating-tubes and provided at their outer ends with flaring mouths in proximity to the floor, all substantially as described.

2. The heating-stove herein described comprising the lower cylindrical portion, the upper cylindrical portion of greater diameter, the intermediate cup-shaped annular portion, the walls of the upper cylindrical portion being cut away at intervals in its periphery, vertical air-heating tubes disposed within the upper cylindrical portion with their surfaces projecting partly through the apertures therein, the lower ends of said tubes being closed and disposed at the upper portion of said cup-shaped portion, a pipe connecting the lower portion with the upper portion and extended through the intermediate cup-shaped portion, and intake-tubes dependent from the exposed surfaces of the air-heating tubes and provided at their lower ends with flared mouths in proximity to the floor, all substantially as described.

In witness whereof I have hereunto set my hand in the presence of two witnesses.

ALF. LANDRY.

Witnesses:
S. E. DESMOIDES,
E. J. DYSON.